April 11, 1939.                L. K. SWART                2,153,777
                          MEASURING INSTRUMENT
                          Filed Jan. 27, 1937
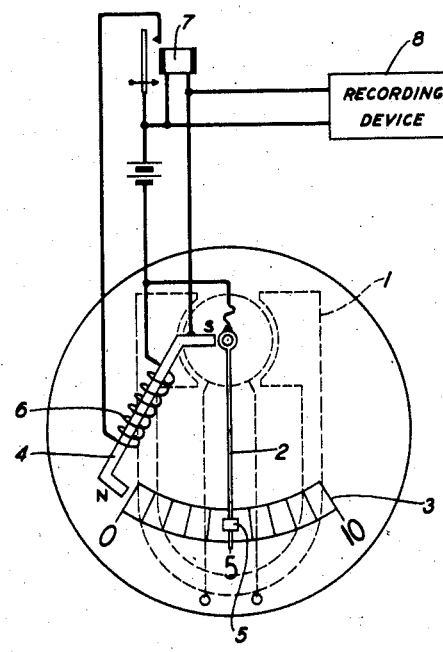
INVENTOR
BY  L. K. SWART
ATTORNEY Patented Apr. 11, 1939

2,153,777

UNITED STATES PATENT OFFICE 2,153,777

MEASURING INSTRUMENT

Leland K. Swart, Mountain Lakes, N. J., assignor to Bell Telephone Laboratories, Incorporated, New York, N. Y., a corporation of New York Application January 27, 1937, Serial No. 122,544

5 Claims. (Cl. 171—95)

This invention relates to measuring instruments and particularly to instruments for indicating the characteristics of electrical circuits.

An object is to provide a simplified instrument of this kind for automatically testing and recording any temporary predetermined electrical condition of a circuit.

Heretofore measuring instruments have been provided in which when a predetermined electrical characteristic of a circuit is established the pointer or indicator of the instrument is arrested in a position indicating this condition. For this purpose a permanent magnet stop is used that attracts and holds the pointer in a fixed position if and when it is moved to this position by a change in the characteristics of current applied to the instrument.

It is a feature of the present invention to provide an instrument of this kind in which, when the pointer has been arrested in a predetermined position, it is automatically released after an interval.

It is another feature of this invention to provide means whereby a record may be made each time the pointer is arrested and released.

These features are accomplished by circuit arrangements and recording means which when the pointer has been attracted by the permanent magnet causes a relay to operate and close a connection for a circuit through a coil on said permanent magnet. The current through this coil causes the permanent magnet to cease attracting the pointer to release it from the attracted position and open the circuit for the relay which due to its slow-to-release characteristics releases a short interval thereafter. This condition may then be recorded by any suitable recording device which is automatically operated by the operation and release of the relay. This invention may, therefore, be employed for operating regulating devices or to record repeated operations of the measuring instrument without requiring it to be manually reset.

The invention has been illustrated in the accompanying drawing which shows a meter or sensitive relay having a permanent magnet stop to which the applicant's invention has been applied.

Referring to the drawing an ordinary measuring instrument such as an ammeter has been shown with the operating parts 1 disclosed in dotted lines with the exception of the pointer 2, the scale 3 and the permanent magnet 4 The pointer 2 is provided with the usual iron rider 5 which, when the pointer 2 is actuated by the meter to swing toward the left, will be attracted by the permanent magnet 4 and hold the pointer in an advanced position that indicates an electrical condition of the circuit including the meter.

The applicant's invention as applied to this meter comprises a coil 6 on the permanent magnet 4, a relay 7, a circuit arrangement therefor and a recording device 8 of any well-known type responsive to circuit closures. The operation of the system is as follows: When the pointer 2 swings towards the left a circuit is established through the contact made by the iron rider 5 with the permanent magnet 4 from battery, pointer 2, rider 5, magnet 4, winding of relay 7 back to battery. This causes the operation of relay 7 which closes a circuit from battery through the armature and front contact of relay 7, the coil 6 back to battery. The current through coil 6 sets up magnetic lines of force to counteract the normal magnet lines of force of the permanent magnet 4 and thereby causes it to cease attracting the rider 5 permitting it to leave the magnet 4, and thus open the circuit for the relay 7. Relay 7 is slow in releasing so as to permit the pointer 2 to assume its normal position as determined by the current operating the meter. The original closure of the connection between the permanent magnet and the rider also closes a circuit for the recording device 8 to record the fact that the pointer 2 assumed a position where it was attracted by the permanent magnet.

The pointer 2 is therefore automatically reset after each occasion when it was attracted by the permanent magnet to indicate a certain electrical condition in the circuit at that moment. It should be understood, of course, that this arrangement may be employed in a number of different ways, for example, for operating a regulating device when a certain electrical condition exists in the circuit for the meter or to record repeated momentary conditions of the circuit operating the meter, without having to manually reset the meter after each operation. The pointer 2 has been shown at the indication 5 on the scale which may be considered as 5 microamperes or any other electrical units. This might indicate a normal condition of the circuit operating the meter. If, for example, something occurs in the circuit to reduce the amperage thereof to zero, the pointer will be attracted by the permanent magnet and this fact recorded. If immediately thereafter the condition of the meter circuit is again restored to 5 microamperes, the pointer will, after being released, again indicate the normal condition. Thus it will be seen that repeated unstandard conditions of the operating circuits for a meter may be recorded by this device. It should be understood that the permanent magnet 4 may be adjusted to attract the pointer at any desired position on the scale 3 to meet any circuit conditions it is desired to record.

What is claimed is:

1. In an electrical measuring device, a pointer actuated by said device, a rider of magnetic material attached to said pointer, a magnetic stop for attracting said rider to hold said pointer in a fixed position after it has been moved a certain distance in the direction of the magnetic stop and means operated a certain interval after the rider has been attracted by said magnetic stop for causing it to cease attracting said rider and to release it.

2. In an electrical measuring device, a pointer, a rider of magnetic material attached to said pointer, a magnetic stop for attracting said rider to hold said pointer in a fixed position after it has been moved a certain distance in the direction of the magnetic stop and means for automatically neutralizing said magnetic stop to release said rider a certain interval after it has been attracted thereby.

3. In an electrical measuring device, a movable pointer operating in response to the application of electrical energy to said device, a rider of magnetic material attached to said pointer, a fixed permanent magnet stop for attracting said rider and holding said pointer in a fixed position after it has been moved a certain distance in the direction of the fixed permanent magnet stop, a slow-acting relay, a source of current, a first circuit including said relay and said source of current, a second circuit, said first circuit being operative a certain interval after the rider has been attracted for actuating said relay, said second circuit being thereafter operative in response to the operation of the relay to neutralize the magnetic effect of said fixed permanent magnet stop to release said rider.

4. In an electrical measuring device, a movable pointer operated in response to the application of electrical energy to said device, a rider of magnetic material attached to said pointer, a fixed permanent magnet stop adapted to attract said rider and hold said pointer in a fixed position after it has been moved a certain distance in the direction of the fixed permanent magnet stop, a slow-acting relay, a source of current, a circuit including a winding of said relay and said source of current and terminating at one end in said fixed permanent magnet stop and at the other end in said rider, a second circuit including a winding for said fixed permanent magnet stop, said source of current and normally opened contacts of said relay, said circuits being operative when the fixed permanent magnet stop has attracted the rider, to close said first circuit to energize said relay and to close said second circuit when said relay is energized for neutralizing the effect of the fixed permanent magnet stop to cause the release of said rider.

5. In an electrical measuring device, a pointer actuated by said device, a rider of magnetic material attached to said pointer, a magnetic stop for attracting said rider and holding said pointer in a fixed position after it has been moved a certain distance in the direction of the magnetic stop, means operative a certain interval after the rider has been attracted by said magnetic stop for causing said magnetic stop to cease attracting the rider to release it from the fixed position and means operative when the rider is attracted and held by the magnetic stop for recording the attraction of the rider by said magnetic stop.

LELAND K. SWART.